May 15, 1962    H. W. LESSING ETAL    3,034,538
ILLUMINATING DEVICE FOR LOOMS

Filed April 11, 1958    3 Sheets-Sheet 2

May 15, 1962   H. W. LESSING ETAL   3,034,538
ILLUMINATING DEVICE FOR LOOMS
Filed April 11, 1958   3 Sheets-Sheet 3
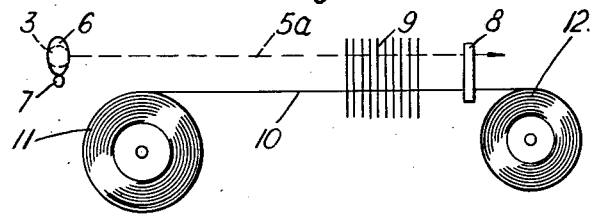
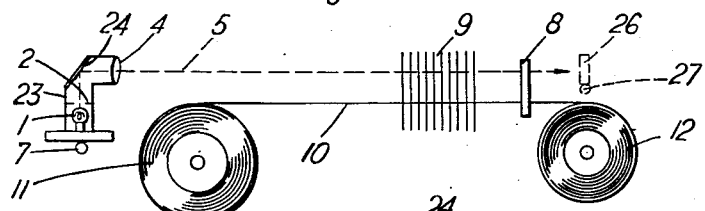
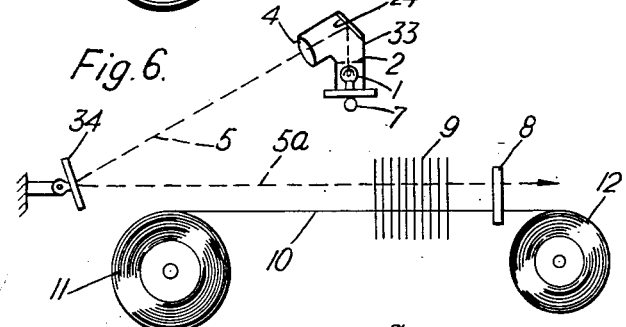
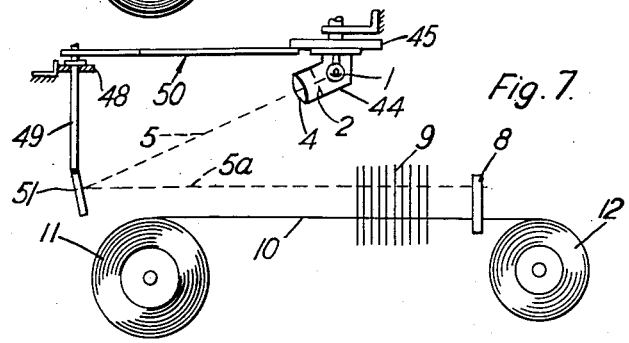

United States Patent Office 3,034,538
Patented May 15, 1962

3,034,538
ILLUMINATING DEVICE FOR LOOMS
Heinz Walter Lessing and Walter Benno Lessing, London, England, and Carl Otto Meiners, Stuttgart, Germany, assignors to Meiners Optical Devices Limited, London, England
Filed Apr. 11, 1958, Ser. No. 727,887
Claims priority, application Great Britain Apr. 12, 1957
15 Claims. (Cl. 139—1)

This invention relates to looms and to illuminating devices therefor.

The re-threading of warps through the reed and healds of a loom, which has to be effected, in particular, when a broken warp is pieced-up, is an operation which is made particularly tedious by the poor illumination of the wires of the reed and the eyes of the healds. Increasing the intensity of the general illumination of the mill makes little difference to the problem. To make threading more easy, it is essential that the part of the reed and the healds at which work is to be done should be brought out in bold relief.

That is achieved in accordance with the invention by the provision of an illuminating device adapted to project on to the reed and the healds a sharply defined beam of light of restricted cross-section made up of a bundle of parallel light rays so as to illuminate only a limited area thereof and the provision of means for traversing the beam across the loom, either continuously or when desired, while maintaining its direction substantially normal to the face of the reed.

In order that the beam be sharply defined, that is to say, devoid of stray rays diverging from the axis of the beam, the illuminating device preferably comprises a source of light, an optical stop and a lens or system of lenses arranged to produce a substantially parallel beam. Alternatively, the beam can be produced by reflection from, say, a parabolic mirror but a lens system still has to be provided to eliminate stray rays.

The direction of the beam is important. By projecting it substantially normal to the face of the reed, the beam can also be used for illuminating the eyes of the healds of the loom. Generally, illumination from the front of the machine is better from a constructional point of view as there is usually more space available at the front of a loom. However, the loom may be illuminated from the back if care is taken to ensure that the beam is not directed into the eyes of the operator.

It is further of importance that the intensity of illumination of the part of the reed or the healds on to which the beam is directed shall not vary substantially as the area illuminated is displaced across the loom. The area of illumination of the reed and harness should therefore not vary substantially as the location of that area changes and that is also ensured by directing the beam substantially normal to the face of the reed.

The displacement of the illuminated area can be effected by movement of the source of light or by movement of a mirror receiving light from a stationary source, or by both.

In order that the invention may be more thoroughly understood, examples of arrangements according to the invention will now be described with reference to the accompanying diagrammatic drawings, in which:

FIGURES 4 to 7 are views similar to FIGURE 3 but showing different illuminating devices.

In the figures of the drawings illuminating devices are shown that are adapted to illuminate a portion of the cloth-producing members of a loom, more specifically the reed and healds.

Figure 1:
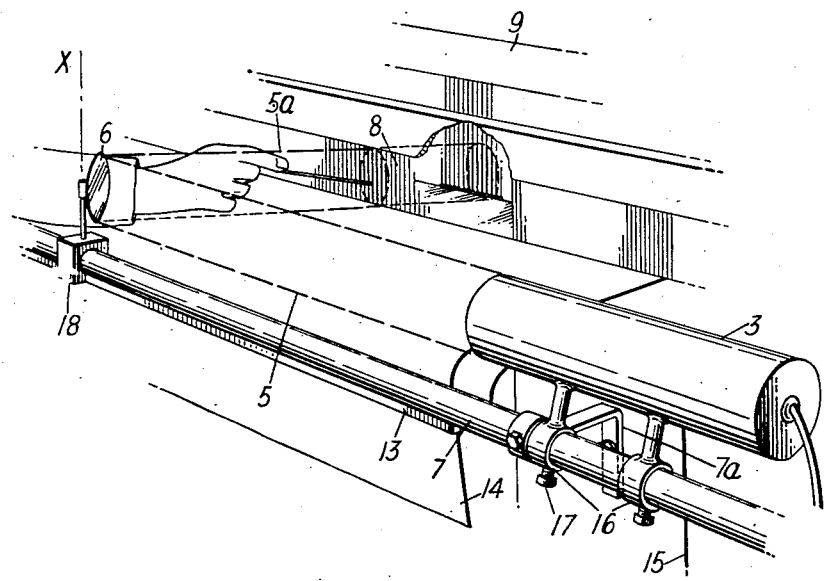
FIGURE 1 is a perspective view of a loom fitted with an illuminating device according to the invention.
Figure 2:
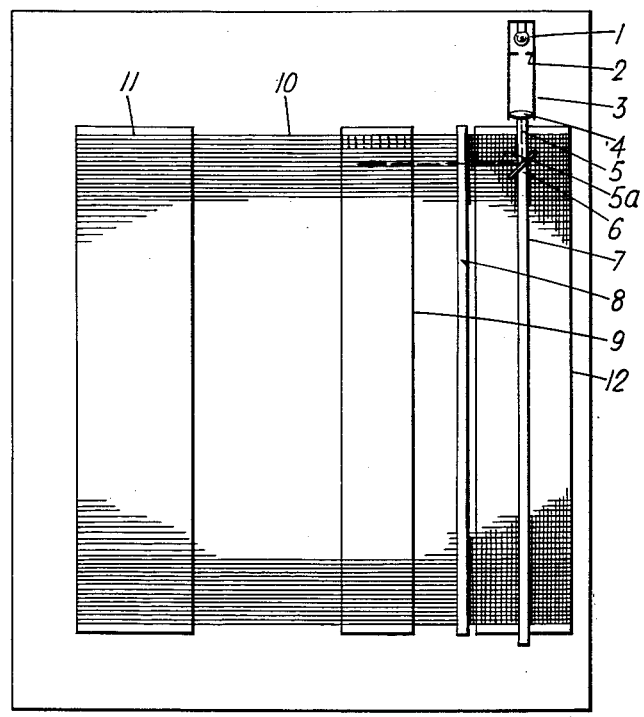
FIGURE 2 is a plan view of the loom shown in FIGURE 1.
Figure 3:
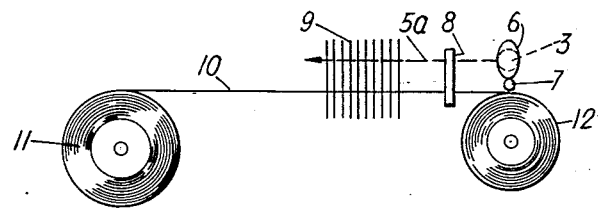
FIGURE 3 is a side elevation of the loom shown in FIGURE 1.

In FIGURES 1 to 3, there is a lamp 1 having a relatively high brightness, which is housed at the closed end of a cylindrical casing 3 which is open to light at its other end where an optical element in the form of a lens 4 is mounted to ensure that the beam 5 emitted from the casing is substantially parallel and thus sharply defined. The beam may usefully have a diameter of between 5 and 15 cm. or thereabouts. An optical stop 2 is located in the casing between the source 1 and the lens 4.

The lamp casing 3, is located at one end of the loom just above a rail 7 which is in the form of a tube or bar of about 1 to 2 inches diameter and has a spline or rib 13. The rail extends along the front of the loom above the cloth beam 12 and substantially parallel thereto. It is attached to the frame 15 of the loom near its ends by brackets 7a (only one is shown in FIG. 1). The lamp casing 3 is fixed to a pair of sleeves 16 so that it can be mounted on the rail with its axis parallel thereto so that the emitted light beam 5 is projected substantially horizontally and at right angles to the warps 10. The casing 3 can be fixed to the rail in any position along the length of the rail by means of clamping screws 17.

A further optical element in the form of a mirror 6 is slidingly mounted on the rail 7 by means of a saddle 18 which embraces the rail and has a slot in which the spline 13 of the rail engages so that it can be displaced across the loom without alteration of the angular relationship between the mirror and the rail. The mirror 6 is mounted on the saddle 18 so that it can be adjusted about the vertical axis X and thus vary the direction in which the light beam 5 emitted from the lamp casing 3 is reflected on to the reed. In general, the mirror will be set at a substantially 45° angle to the rail so that the light is reflected substantially normal to the general plane of the reed 8 and healds 9, i.e. normal to the face of the reed 8, as shown at 5a. This ensures that the eyes in the healds 9 of the loom are not obscured by the wires of the reed and are also illuminated. The warp beam of the loom is designated 11 and the woven fabric 14.

The rail 7 could, of course, be slotted and the saddle 18 splined.

The mirror 6 and its saddle 18 may be moved along the rail 7 by the weaver according to need, so as to focus the beam 5a of light on to a particular place when an irregularity such as a broken warp has occurred. Alternatively, they can be traversed mechanically across the loom so that the beam scans the reed 8 and the healds 9 continuously. In that case, if the traverse drive is taken direct from the drive for the loom, a clutch must be provided to permit the weaver to stop the mirror in the position where illumination is required.

The light source can be an incandescent lamp preferably of low voltage so that it is not adversely affected by vibrations.

In the hand operated form of the invention as illustrated, when illumination is not required the saddle 18 can be moved along the rail to the end of the loom opposite to that where the lamp casing 3 is located. All parts of the device are then safely out of the way of the weaver. In this inoperative position of the mirror, the lamp can be switched off. The mirror can be adapted to trip an on-off electric switch for the lamp as a result of being brought into and out of the inoperative position.

In FIGURE 4, the illuminating device and the rail 7 are located at the back of the machine near the warp beam 11 so that the beam 5a of light reflected from the mirror 6 is directed through the healds 9 onto the reed 8 from the back of the loom.

In both arrangements described above, the rail 7 can be removably fixed to the loom or it can be a permanent fixture such, for example, as the starting bar.

FIGURE 5 shows a modification in which the illuminator comprises a lamp casing 23 which is displaceable across the loom, the mirror 6 of FIGURES 3 and 4 being dispensed with. As in FIGURE 4, the rail 7 is shown located at the back of the loom, and the light 5 from it is projected over the warp beam 11 forwardly onto the reed 8. Since the light beam is directed substantially horizontally and parallel to the warps 10, i.e. substantially normal to the reed 8, the heald eyes are also adequately illuminated and the light does not shine in the operator's eyes. In this case, the illuminator comprises an electric lamp 1, and optical stop 2 and a lens 4, as in FIGURES 1 to 4 but there is also an additional optical element in the form of a mirror 24 in the casing which reflects the light from the source through 90°. The weaver moves the casing along the rail 7 according to need. Thus, the light beam as projected by the lamp lies in a vertical plane substantially at right angles to the guide member constituted by the rail 7 and travels across the machine in a direction at right angles to its own axis while maintaining its perpendicular relationship to the rail.

FIGURE 6 shows an arrangement in which the lamp housing reciprocates along a rail 7 above the loom. The housing 33 houses a reflecting optical element or mirror 24 to reflect light from the lamp 1 onto a further reflecting optical element in the form of a mirror 34 fixed to the machine frame just above and behind the warp beam 11 of the loom and extending across the width of the loom. Alternatively, the mirror 34 can be at the front of the loom. The mirror is set at an angle such that the beam 5 from the lamp is directed onto the reed substantially normally thereto (5a).

In FIGURE 7, the illuminator comprises a housing 44 which is mounted for oscillation above the loom on a turntable 45 so as to direct a beam 5 on to an optical element in the form of a mirror 51 mounted for oscillation about a vertical axis and also for rectilinear movement across the loom, the movements of the lamp housing and the mirror being mechanically or electrically linked so that in all positions, the mirror intercepts the beam 5 and reflects it forwardly (as shown at 5a) through the eyes in the healds 9 and onto the reed 8 substantially normally thereto.

One way of achieving synchronized movement between the lamp housing 44 and the mirror 51 mechanically can be as follows:

The turntable 45 on which the lamp housing is mounted is provided with a lever system 50 which carries at its end a shaft 49 supporting the mirror 51 and mounted in a slotted guide 48 fixed to the frame of the loom. The shaft 49, and hence the mirror 51, are displaced across the loom by the levers 50 whenever the lamp housing 44 is rotated. However, in order that the area of illumination of the reed 8 by the reflected beam 5a does not vary substantially as the location of the area is changed, the lever system 50 is designed not only to displace the shaft and mirror as the turntable is turned, but also to turn the shaft 49, and hence the mirror 51, through 1° for every 2° of rotation of the turntable 45, in the same sense.

The turntable can be oscillated by hand according to need or the beam 5a can be made to scan the reed and the healds continuously by oscillating the turntable mechanically.

In the arrangements described above, the mirror 6 (FIGS. 1 to 4) or the lamp housing 23 or 33 (FIGS. 5 and 6, respectively) can be made to traverse the loom mechanically or, in the case of FIG. 7, the housing 44 can be oscillated mechanically, by any suitable means which permit the weaver to stop the beam 5a in the position where illumination is required. The traversing or oscillating drive can in that case be operated electronically by means of a light-sensitive device. Such a device is shown diagrammatically in broken lines in FIG. 5, in the form of a photo-electric cell 26 which is slidably mounted in the path of the emerging light beam 5 on a rail 27 fixed to the loom frame and which reacts to contrasts in the intensity of the light caused by irregularities such as a broken warp. The device 26 responds to changes in the light intensity of the emerging beam 5 by generating an electric signal for stopping the beam at the place where a fault has occurred. The device 26 may extend across the loom co-extensive with the reed 8 and the healds 9, in which case it can be fixed in its position, or it can have a width the same as that of the beam in which case it is adapted to move in unison with the beam.

We claim:

1. In a loom having a frame with a reed and healds thereon, apparatus for illuminating the reed and healds comprising a horizontal guide rail secured to the frame and extending parallel to the reed face, a lamp mounted in fixed position on said guide rail at one end thereof beyond the reed to project a sharply defined beam of light of restricted cross-section in a direction parallel to the guide rail and reed face, and a mirror mounted on the guide rail for adjustment along it, said mirror being set at a substantially 45° angle to the rail and reflecting the beam from the lamp through a right angle toward the plane of the reed face so that the reflected beam illuminates a restricted area of the reed and healds and is substantially normal to the face of the reed with movement of the mirror along the guide rail acting to shift the illuminated area along the reed without substantially altering the angle at which the light strikes the reed and healds.

2. In a loom having a frame with a warp beam, a cloth beam and a reed and healds thereon, apparatus for illuminating the reed and healds comprising a guide member on the frame in front of the reed and extending parallel to the warp and cloth beams, a lamp mounted in fixed position at one end of the guide member to project a sharply defined beam of light of restricted cross-section in a direction substantially parallel to the guide member, and a mirror set at a substantially 45° angle to the light beam and mounted on the guide member for displacement along it without alteration of the angular relationship of the mirror and the guide member, said mirror reflecting the beam of light rearwardly toward the reed and through substantially a right angle into a path substantially normal to the reed face to illuminate a limited area of the reed and the healds through the reed, the reflected beam moving along the reed face while remaining substantially normal thereto as the mirror is displaced along the guide rail.

3. Apparatus according to claim 1, wherein the guide rail is mounted on the loom frame behind the reed and healds and the reflected beam of light is directed forwardly on to the reed through the healds.

4. In a loom having a frame with a reed and healds thereon, apparatus for illuminating the reed and healds comprising a horizontal guide rail on the frame parallel to the reed face, and a lamp mounted on the guide rail to project in a direction substantially normal to the reed face a sharply defined beam of light of restricted cross-section made up of a bundle of parallel light rays thereby to illuminate solely by rays normal to the reed face a restricted area of the reed and healds at a time, the lamp being slidable along the guide rail without angular movement whereby the illuminated area of the reed is moved along the reed while the perpendicular relationship of the beam to the reed face is maintained.

5. Apparatus according to claim 4, wherein the guide rail is mounted on the loom frame behind the reed and healds and the beam of light is directed forwardly onto the reed through the healds.

6. In a loom having a frame with a reed and healds thereon, apparatus for illuminating the reed and healds comprising a horizontal guide member on the frame and extending parallel to the reed face, a lamp mounted on the guide member to project a sharply defined beam of light of restricted cross-section in a direction other than toward the reed and healds and in a vertical plane substantially at right angles to the guide member, the lamp being slidable along the guide member without changing its angular relationship with respect thereto, and a mirror mounted on the loom frame which changes the angular direction of the lamp beam in the vertical plane only and reflects it into a path toward the reed and healds and substantially normal to the reed face the reflected beam moving along the reed while maintaining its perpendicular relationship thereto as the lamp is slid along the guide member.

7. Apparatus according to claim 6, wherein the guide member with the lamp thereon is mounted above the reed with the lamp directing its beam downwardly and rearwardly, and the mirror is fixed to the loom frame to the rear of the reed and healds and reflects the beam forwardly onto the reed through the healds.

8. In a loom having a frame with warp and cloth beams and a reed and healds thereon, apparatus for illuminating the reed and healds comprising guide means on the frame extending parallel to the warp and cloth beams, and a light source and optical system therefor mounted on the loom, the optical system projecting onto the reed and healds in a direction substantially normal to the reed face a sharply defined beam of light of restricted crosssection made up of a bundle of parallel light rays thereby to illuminate a limited area of the reed and healds at a time solely by rays normal to the reed face, and said optical system including at least one optical element that is mounted on the guide means for adjustment therealong to move the beam of light along the reed while maintaining it normal to the reed face.

9. Apparatus according to claim 8, wherein the light source and optical system, including said optical element, are incorporated in a lamp structure which structure is mounted on the guide means for adjustment therealong without changing its angular relationship with respect to said guide means.

10. Apparatus according to claim 8 wherein the optical system includes an optical stop for the light source and lens means arranged to project a substantially parallel-sided beam of light.

11. In a loom having a frame with warp and cloth beams and a reed and healds thereon, apparatus for illuminating the reed and healds comprising a light source and an optical system therefor mounted on the loom, the optical system projecting on to the reed and healds in a direction maintained substantially normal to the reed face a sharply defined beam of light of restricted cross-section made up of a bundle of parallel light rays thereby to illuminate solely by rays normal to the reed face a limited area of the reed and healds at a time.

12. In a textile machine having a frame with cloth-producing members thereon, apparatus for illuminating a restricted portion of said cloth-producing members comprising guide means on the frame extending at right-angles to the general direction of travel of cloth produced by said cloth-producing members, and a light source and an optical system therefor mounted on the frame, the optical system projecting on to said portion of the cloth-producing members in a direction substantially normal to the general plane of said portion of the cloth-producing members a sharply defined beam of light of restricted cross-section made up of a bundle of parallel light rays, and said optical system including at least one optical element that is mounted on the guide means for travel along it to move the beam of light across the cloth-producing members while maintaining it normal to the plane of said portion thereof.

13. In a textile machine having a frame with cloth-producing members thereon, illuminating apparatus comprising a horizontal guide rail secured to the frame and extending at right-angles to the general direction of travel of cloth produced by the machine, a lamp mounted in fixed position on said guide rail at one end thereof to project a sharply-defined beam of light of restricted cross-section in a direction parallel to the guide rail, and a mirror mounted on the guide rail for movement to and fro along it, said mirror is set at a substantially 45° angle to the rail and reflecting the beam from the lamp through a right angle, with movement of the mirror along the guide rail acting to shift the reflected beam in a direction at right-angles to its axis without substantially altering its angular direction.

14. In a textile machine having a frame with cloth-producing members thereon, illuminating apparatus comprising a horizontal guide member on the frame and extending at right-angles to the general direction of travel of cloth produced by the machine, a lamp mounted on the guide member to project a sharply defined beam of light of restricted cross-section in a direction lying in a vertical plane substantially at right angles to the guide member, the lamp being slidable along the guide member without changing its angular relationship with respect thereto, and a mirror mounted on the frame which reflects the beam and changes its angular direction in the vertical plane only, the reflected beam travelling across the machine in a direction at right-angles to its own axis while maintaining its perpendicular relationship to the guide member when the lamp is slid along the guide member.

15. In a loom having a frame with warp and cloth beams and a reed and healds thereon, apparatus for illuminating the reed and healds comprising guide means on the frame extending parallel to the warp and cloth beams, a lamp structure comprising a light source and elements of an optical system therefor for projecting a sharply defined beam of light of restricted cross-section which lamp structure is mounted on the loom frame in fixed position to direct its beam of light parallel to the guide means, and a further element of the optical system mounted to traverse along the guide means without changing its angular relationship thereto and reflect the light beam out of its path parallel to the guide means and onto the reed and healds in a path normal to the reed face to illuminate a limited area of the reed and healds at a time, whereby traverse of said optical element that is mounted on the guide means causes the illuminated area to travel along the reed while the light beam is maintained normal to the reed face.

References Cited in the file of this patent

UNITED STATES PATENTS

| | | |
|---|---|---|
| 2,279,759 | Moore | Apr. 14, 1942 |
| 2,483,840 | Parker | Oct. 4, 1949 |
| 2,625,785 | Meiners | Jan. 20, 1953 |
| 2,839,669 | Meiners et al. | June 17, 1958 |

FOREIGN PATENTS

| | | |
|---|---|---|
| 61,700 | France | Dec. 1, 1954 |